United States Patent
Yaron et al.

(10) Patent No.: US 12,204,651 B2
(45) Date of Patent: Jan. 21, 2025

(54) CYBER ATTRIBUTION OF SOFTWARE CONTAINERS

(71) Applicant: Dazz, Inc., Palo Alto, CA (US)

(72) Inventors: Eshel Yaron, Tel Aviv (IL); Tomer Schwartz, Tel Aviv (IL); Pavel Resnianski, Tel Aviv (IL)

(73) Assignee: Dazz, Inc., Palo Alto, CA (US)

( * ) Notice: Subject to any disclaimer, the term of this patent is extended or adjusted under 35 U.S.C. 154(b) by 202 days.

(21) Appl. No.: 17/656,914

(22) Filed: Mar. 29, 2022

(65) Prior Publication Data

US 2023/0315860 A1    Oct. 5, 2023

(51) Int. Cl.
*G06F 21/57* (2013.01)

(52) U.S. Cl.
CPC ...... *G06F 21/577* (2013.01); *G06F 2221/033* (2013.01)

(58) Field of Classification Search
CPC .......................... G06F 21/577; G06F 2221/033
See application file for complete search history.

(56) References Cited

U.S. PATENT DOCUMENTS

| | | | |
|---|---|---|---|
| 8,806,425 B1 | 8/2014 | Willis et al. | |
| 9,052,961 B2 | 6/2015 | Mangtani et al. | |
| 10,108,803 B2 | 10/2018 | Chari et al. | |
| 11,893,106 B2 * | 2/2024 | Kim | G06F 21/53 |
| 2003/0131284 A1 | 7/2003 | Flanagan et al. | |
| 2009/0222479 A1 | 9/2009 | Burukhin et al. | |
| 2013/0167241 A1 | 6/2013 | Siman | |
| 2015/0341214 A1 | 11/2015 | Croy et al. | |
| 2016/0379480 A1 | 12/2016 | OlmstedThompson et al. | |
| 2017/0075749 A1 | 3/2017 | Ambichl et al. | |
| 2017/0185785 A1 * | 6/2017 | Vorona | G06F 21/552 |
| 2017/0249128 A1 * | 8/2017 | Fojtik | G06F 8/71 |
| 2017/0286692 A1 | 10/2017 | Nakajima et al. | |

(Continued)

FOREIGN PATENT DOCUMENTS

| | | |
|---|---|---|
| EP | 3208996 A1 | 8/2017 |
| EP | 3494506 A1 | 6/2019 |

OTHER PUBLICATIONS

Doan TP, Jung S. Davs: Dockerfile Analysis for Container Image Vulnerability Scanning. CMC—Computers Materials & Continua. Jan. 1, 2022;72(1):1699-711. Jan. 1, 2022 (Jan. 1, 2022).

(Continued)

*Primary Examiner* — Azizul Choudhury
(74) *Attorney, Agent, or Firm* — M&B IP Analysts, LLC

(57) ABSTRACT

A system and method for software containers attribution are provided. The method includes de-compiling a configuration file of a container image of a software container; identifying at least one candidate build file in the de-complied configuration file, wherein the at least one candidate build potentially formed the container image; determining if at least one matching condition is satisfied between each of the at least one candidate build file and the de-complied configuration file; associating the configuration file with each candidate build file satisfying the matching condition; and updating an inventory with the associated configuration file and the (Continued)

respective candidate build, wherein such association provides a direct mapping between the container image and the build files formed the container image.

25 Claims, 5 Drawing Sheets

(56) References Cited

U.S. PATENT DOCUMENTS

| | | |
|---|---|---|
| 2018/0025160 A1 | 1/2018 | Hwang et al. |
| 2018/0129479 A1 | 5/2018 | McPherson et al. |
| 2018/0285199 A1* | 10/2018 | Mitkar ................ G06F 11/2038 |
| 2018/0321918 A1* | 11/2018 | McClory ............ H04L 41/5041 |
| 2019/0007290 A1 | 1/2019 | He et al. |
| 2019/0294477 A1 | 9/2019 | Koppes et al. |
| 2020/0097662 A1 | 3/2020 | Hufsmith et al. |
| 2020/0296117 A1 | 9/2020 | Karpovsky et al. |
| 2021/0042096 A1 | 2/2021 | White, III et al. |
| 2021/0168165 A1 | 6/2021 | Alsaeed et al. |
| 2021/0182387 A1 | 6/2021 | Zhu et al. |
| 2021/0311855 A1* | 10/2021 | Khan .................... G06F 11/362 |
| 2022/0129539 A1 | 4/2022 | Walsh et al. |
| 2023/0036739 A1* | 2/2023 | Deppisch ............ G06F 9/45558 |

OTHER PUBLICATIONS

International Search Report for PCT application PCT/IB2023/052413 dated Jun. 12, 2023. The International Bureau of WIPO.

Written Opinion of the Searching Authority for PCT application PCT/IB2023/052413 dated Jun. 12, 2023. The International Bureau of WIPO.

International Search Report for PCT Application No. PCT/IB2022/059483. The International Bureau of WIPO.

Written Opinion of the International Searching Authority for PCT Application No. PCT/IB2022/059483 dated Jan. 8, 2023. The International Bureau of WIPO.

International Search Report, PCT/IB2023/052415; Israel Patent Office, Jerusalem. Dated Jun. 14, 2023.

Written Opinion of the International Searching Authority, PCT/IB2023/052415. Israel Patent Office, Jerusalem. Dated Jun. 14, 2023.

International Search Report for PCT/IB2023/057511, dated Nov. 2, 2023. Searching Authority Israel Patent Office, Jerusalem, Israel.

Written Opinion of the Searching Authority for PCT/IB2023/057511, dated Nov. 2, 2023. Searching Authority Israel Patent Office, Jerusalem, Israel.

* cited by examiner

CYBER ATTRIBUTION OF SOFTWARE CONTAINERS

TECHNICAL FIELD

The present disclosure relates generally to attribution of software containers in virtualized execution environments.

BACKGROUND

Cyber (or security) attribution is the process by which security analysts collect evidence, build timelines, and try to piece together evidence in the wake of a cyber-attack, to determine what caused the breach. That is, understanding what and who caused the breach can be a valuable source of intelligence for cyber-breach victims. For example, attribution of a detected malware can identify the type of resource utilized to run the malware (e.g., a software agent running a Linux® agent), the network resources that the malware communicated with, local resources that have been exploited, and so on. The attribution may not necessarily lead to a hacker who maliciously exploited the vulnerability but also to a programmer who accidentally caused the vulnerability.

Attribution as performed today, requires security researchers (human) to investigate at least the source of the vulnerability. As such, cyber attribution usually requires significant amounts of time and resources. Furthermore, in many cases, the process involves a significant amount of educated guesswork, meaning results are not deterministic and can often be subject to debate.

Attribution of software containers is a very complex problem due, in part, to the structure of containers and how they are formed. A software container, such as build by Docker®, is a standard unit of software that packages code and all its dependencies to allow applications to run from one computing environment to another. A software container includes a container image which is a lightweight, stand-alone, executable package of software that includes all resources to run an application including code, runtime, system tools, system libraries and settings. The build file (e.g., Dockerfile) contains all the commands to assemble and create a container image. Using a build file, users can create an automated build that executes several command-line instructions in succession.

Attribution of software containers would allow for determination of the root cause of vulnerabilities detected in containers. Current techniques disclosed in the related art allows for identification of vulnerabilities in software containers either as a static container image or as an executable instance. However, current container security techniques cannot identify the root cause of detected vulnerabilities. This is a limitation as the source of the vulnerabilities cannot be corrected quickly without having significant down time of the application running a vulnerable container. Further, identifying the root cause of the vulnerabilities can determine who (e.g., a programmer) caused any detected vulnerability and whether the source of the vulnerability is associated with other container images. That is, attribution of software containers would allow for further investigation of reasons for vulnerabilities and prevent similar vulnerabilities in the future, and to further allow for fixing such vulnerabilities at minimum delay.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method includes de-compiling a configuration file of a container image of a software container; identifying at least one candidate build file in the de-compiled configuration file, wherein the at least one candidate build potentially formed the container image; determining if at least one matching condition is satisfied between each of the at least one candidate build file and the de-compiled configuration file; associating the configuration file with each candidate build file satisfying the matching condition; and updating an inventory with the associated configuration file and the respective candidate build, wherein such association provides a direct mapping between the container image and the build files formed the container image.

Certain embodiments disclosed herein also include a non-transitory computer readable medium having stored thereon causing a processing circuitry to execute a process, the process comprising: de-compiling a configuration file of a container image of a software container; identifying at least one candidate build file in the de-compiled configuration file, wherein the at least one candidate build potentially formed the container image; determining if at least one matching condition is satisfied between each of the at least one candidate build file and the de-compiled configuration file; associating the configuration file with each candidate build file satisfying the matching condition; and updating an inventory with the associated configuration file and the respective candidate build, wherein such association provides a direct mapping between the container image and the build files formed the container image.

Certain embodiments disclosed herein also include a system software containers attribution, comprising: a processing circuitry; and a memory, the memory containing instructions that, when executed by the processing circuitry, configure the system to: de-compile a configuration file of a container image of a software container; identify at least one candidate build file in the de-compiled configuration file, wherein the at least one candidate build potentially formed the container image; determine if at least one matching condition is satisfied between each of the at least one candidate build file and the de-compiled configuration file; associate the configuration file with each candidate build file satisfying the matching condition; and update an inventory with the associated configuration file and the respective candidate build, wherein such association provides a direct mapping between the container image and the build files formed the container image.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
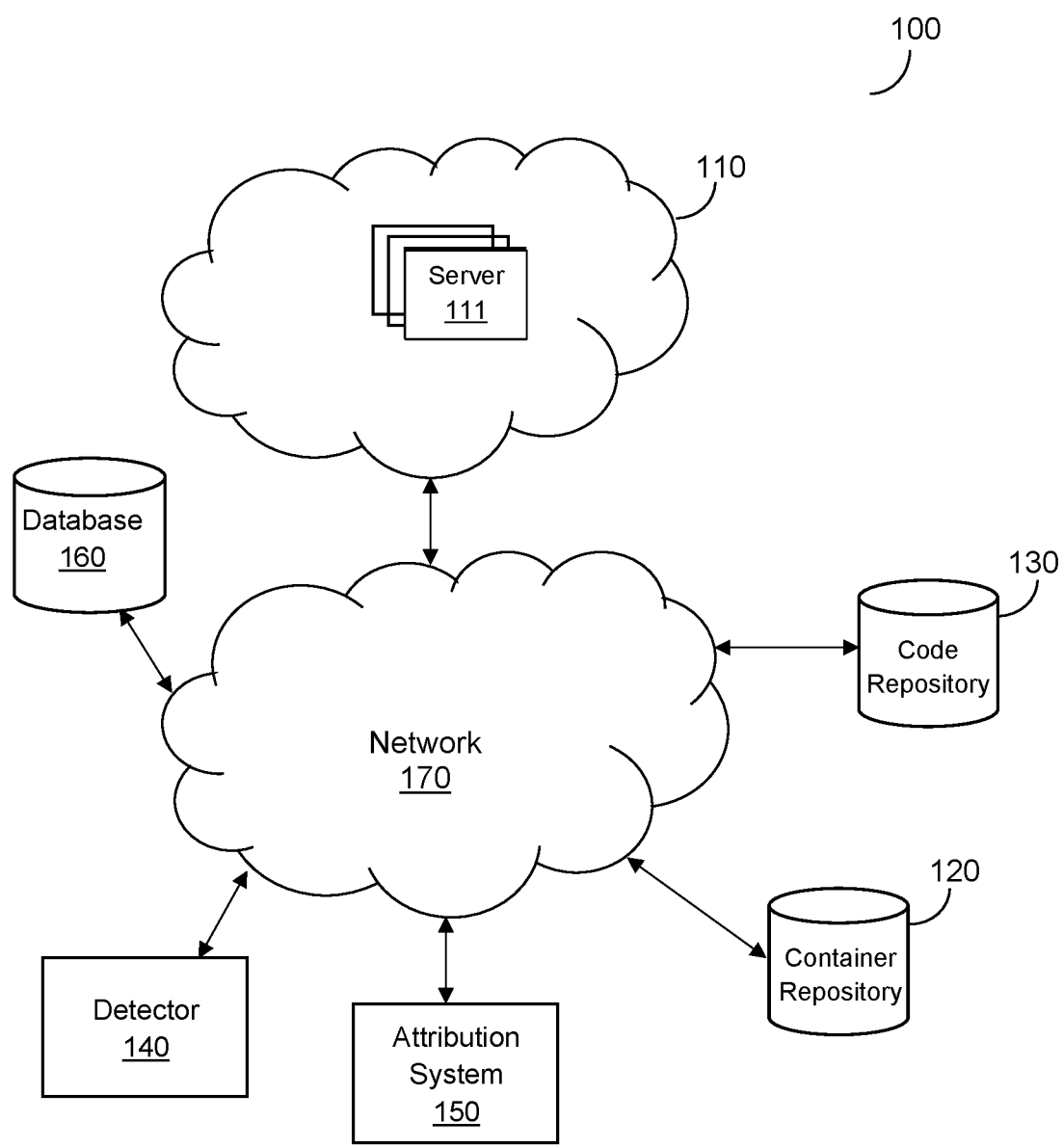
FIG. 1 is a system network diagram utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

It has been a challenge to secure software applications executing software containers due to the way containers are built and executed. It has been identified that providing attribution for software containers would allow for immediate identification of any vulnerability exist or detected in a container, and for immediate correction of such vulnerability.

To this end, the disclosed embodiments provide techniques for attribution of software containers. Specifically, the disclosed embodiment provides a deterministic mapping between a container image and a build file utilized to create the image. The disclosed embodiments can also provide deterministic mapping between a specific layer in the container image and a code line in the build file from which the layer is created. Therefore, when a vulnerability is detected or reported in a specific container or layer, the build file and code line responsible for creation of the infected layer can be immediately identified, and the vulnerability can be mitigated by altering the identified responsible code and building a non-vulnerable container from the fixed build file. Accordingly, the disclosed embodiments provide techniques for improving security of the software infrastructure.

Further, it has been identified that, even if users (e.g., security analysts) are theoretically capable of identifying such attribution of the root causes of a vulnerable container image or layer within an image, the manual process for identifying root causes by a user relies on subjective evaluations of connections based on the operator's understanding of the structure of the containers. This could lead to some guesswork, and thus results that are not deterministic. Moreover, in a typical organization, there are thousands of software containers implemented that can be programmed by programmers from inside and/or outside the organization. During a lifetime of a container, the build file can be modified multiple times, thus having multiple versions of the same build files may be associated with the container image. The inconsistency in the development process and registry of containers may lead to manual analysis of potential mappings, thereby leaving vulnerabilities untreated and exposed. Additionally, the results of such manual analysis can vary between individuals, thus causing confusion and results in inconsistent interpretations of reported cybersecurity events and vulnerabilities.

The various disclosed embodiments include methods and systems for attribution of software containers by analyzing manifest (or "config. File") associated with container images and build files, mapping each container image to a single build file as well as mapping each layer in the container image to a specific code line. The method further includes populating an inventory based on the mappings (attribution) and enriching the inventory with any detected or reported vulnerability in a container. This allows for tracing the build tree back to the exact code line which triggered the vulnerability.

FIG. 1 shows an example network diagram 100 utilized to describe the various disclosed embodiments. The example network diagram 100 illustrates a cloud computing platform 110 including servers 111 configured to execute applications through an instantiation of one or more software containers. The images of the software containers are stored in a container image repository (or simply a container repository) 120 and their build files are stored in a code repository 130. The software containers can be built and executed in any containerized environment, such as Kubernetes®, Docker®, and the like. The servers 111 may operate in a production environment. The cloud computing platform 110 may be a private cloud, a public cloud, and/or a hybrid cloud.

A software container, such as built by Docker® is a standard unit of software that packages code and all its dependencies to allow applications to run from one computing environment to another. A software container includes a container image which is a lightweight, stand-alone, executable package of software that includes all resources to run an application including code, runtime, system tools, system libraries and settings. The build file (e.g., Dockerfile) contains all the commands to assemble and create a container image. The build file allows an automated build of container images. A container image includes several layers, where each layer corresponds to certain instructions in the build file. For example, a base layer would be a version of an operating system (e.g., Ubuntu).

The container repository 120 maintains a collection of container images used to provide different versions of an application. The container repository 120 may be an integral element of development and deployment practices that make use of containers and PaaS environments. DevOps teams make use of software containers, and most teams pull a variety of container images from numerous sources, such as an open source or a source proprietary to the organization. DevOps team may build custom container images, optionally using existing ones as layers, and share their source code or container images. An organization will use a container repository to share container images with its team or with the broader repository platform community. It should be noted that the repository 120 may be a public repository or a private repository that allows an organization to keep its images private within the development team.

Each container image stored in the container repository 120 contains a manifest file, which is a text-based file (e.g., JSON). The manifest (e.g., Docker manifest) includes information about a container image, such as layers, size, and digest. The docker manifest command also gives users additional information, such as the operating system (OS) and architecture an image was built for. A manifest list (.config file) is a list of image layers that is created by specifying one or more (ideally more than one) image names. The manifest may define metadata designating, for example, build information, license information, or any customized data. The data metadata is set by a programmer and may not be accurate or updated. According to an embodiment, a .config layer (hereinafter "configuration file") is retrieved from the manifest for analysis.

The code repository 130 includes the build files of the container images in the container repository 120. The code repository 130 may be a private or public repository. Examples for the code repository 130 includes Git®, Mercurial, Subversion, Perforce, and the like.

Also, shown in FIG. 1, is a detector 140 configured to detect vulnerabilities or misconfigurations in software containers executed in the application server 111 or container images stored in the container repository 120. The detector 140 is a third-party system, and the operation of which is outside the scope of the disclosed embodiments.

According to the disclosed embodiments, an attribution system 150 is operable to provide attribution of container images stored in the container repository 120 and enrich the determined attributions with vulnerabilities reported by the detector 140. The attribution system 150 is configured to communicate, access information, or pull data stored in the container repository 120, the code repository 130, and the detector 140.

In an embodiment, the attribution system 150 is configured to retrieve build files from the code repository 130 and configuration files metadata of container images in the container repository 120. The retrieved configuration files and build files are of containers executed in servers for software applications of a specific organization. Then, for each configuration file (or a container image), the attribution system 150 is configured to find a corresponding build file that created the image. That is, for example, if a container image "A" was created using a "build_file_1", the attribution system 150 would attempt to map these to two entities.

The attribution system 150 may be configured to retrieve configuration files and not the container images so the amount of data being transferred to and processed by the attribution system 150 is limited to the textual files of the container images and not the entire the data of the images. It should be appreciated that when needed, the entire container image can be downloaded from the repository as well.

The attribution system 150 is configured to analyze each build file and configuration file to provide a deterministic mapping between a container image and a build file. However, the information retrieved from the repositories 120 and 130 does not always allow for deterministic mappings. Thus, the attribution system 150 is configured to implement and utilize techniques and heuristics to enable such mappings. Specifically, a number of build files, at the outset, can be potentially mapped to a single container image. Further, a container image can be an outcome of multiple build files and single build file can be programmed to create multiple containers.

To this end, the attribution system 150 is configured to de-compile the container images and check if one or more matching conditions between the de-compiled image and the build files are met. A de-compiled image is the configuration file retrieved from the manifest of the respective image and is processed to remove any information that cannot contribute to the matching. Such information may include, for example, hash values of the various images in the container image.

In an embodiment, to determine if a configuration file (de-compiled) matches a build file, all commands from the build file are matched to all commands in the configuration file, excluding, for example, FROM or LABEL commands (hereinafter "excluded commands or command"). To this end, a configuration file may be searched for all commands starting from the last command in the file until the first excluded command is encountered. The first matching attempt may result with a number of candidate build files for a single configuration file. When there is more than one candidate build files, such files are checked against one or more matching conditions to determine which of the candidate files can be associated with a container image. If only one build file is found to match the configuration file, then the mapping is deterministic.

In an embodiment, the matching conditions include, but are not limited to, similarity; equal files; creation time; number of commands; and hierarchical matching. The various different matching conditions are required as the configuration file, in most cases, does not exactly match the image layer.

In the similarity matching condition, it is checked if all candidate build files are the same. This may happen when the same build file is saved in different locations (e.g., folders) by the same user or different users.

In an embodiment, the creation time matching condition includes comparing the image container's creation time to the creation date of a candidate build file, and if the former date is later, then this build file was not the source of the image. For example, if a creation data of "build_file_1" is Jan. 1, 2021, and the creation of the container image "A" is Jan. 1, 2020, then "build_file_1" was not utilized to create the container image "A."

In another embodiment, the number of commands matching includes comparing the number of commands in the build file to the number of commands (without the excluded commands) in the de-compiled configuration file. If the number of commands are the same, the build file can be associated with the container image. In an embodiment, if the number of commands are not the same, then the build file that includes the maximum number of "matching" commands is determined to be the matching file. For example, there are 2 candidates, "build_file_1" and "build_file_2", to match to a configuration file A' of a container image "A". "Build_file_1" includes 10 commands matching to 10 commands in the configuration file A' and "build_file_2" includes 20 commands matching to 20 commands in the configuration file A'. Thus, the container image "A" is mapped to the "build_file_2."

In another embodiment, hierarchical matching is performed when a container image is formed from multiple build files. In this case, an attempt to map a single build file would not provide the proper matching. Thus, in this embodiment, a dependencies tree is created to represent the relationship between build files and a container image. The dependencies tree is created by listing all commands starting from the last command until the first excluded command (or any equivalent command for image creation) is encountered. This is performed for each candidate build file. This list of commands is matched to the configuration file which should all include all the commands in the list. Every candidate build file, having a set of commands mapped to the configuration file, is associated with the respective container image. The hierarchical matching will be discussed in more detail below with reference to FIG. 4.

The attribution system 150 is further configured to map a code line in the build file to the respective layer in the associated container image. That is, when a container image is associated with a build file (or files) based on the deterministic matching, the build file is further analyzed to map the code lines that form layers in the container image.

The attribution system 150 is further configured to populate an inventory of container images and their associated build files. The inventory is enriched with the code lines in each build file that form layers with reported or known vulnerabilities. The inventory may be a data structure, such as a tree structure stored in a memory of the attribution system 150 or any other storage. In an embodiment, the generated inventory can be saved in storage or a database 160.

It should be appreciated that the attribution of container images as stored in the inventory would allow for quick remediation and detection of vulnerability (reported by the detector 140). A user, e.g., a programmer who programmed the build file of a vulnerable container, can be alerted to which build file and/or event in the respective code lines that the vulnerability results from. In a typical organization with thousands of container images in a production environment, this process may be a significant reduction in time and effort in providing a secure environment.

The repositories 120, 130, the detector 140, the attribution system 150, and database 160 may be connected to a network 170. The network 170 may be a local area network (LAN), a wide area network (WAN), the Internet, and the like. Further, the repositories 120, 130, the detector 140, the attribution system 150, and/or the database 160 may be hosted in a cloud environment such as the cloud computing platform 110 or a different platform. In some configurations, the attribution system 150 can be integrated in the detector 140.

It should be understood that the embodiments described herein are not limited to the specific architecture illustrated in FIG. 1, and other architectures or deployment may be equally used without departing from the scope of the disclosed embodiments.

Figure 2:
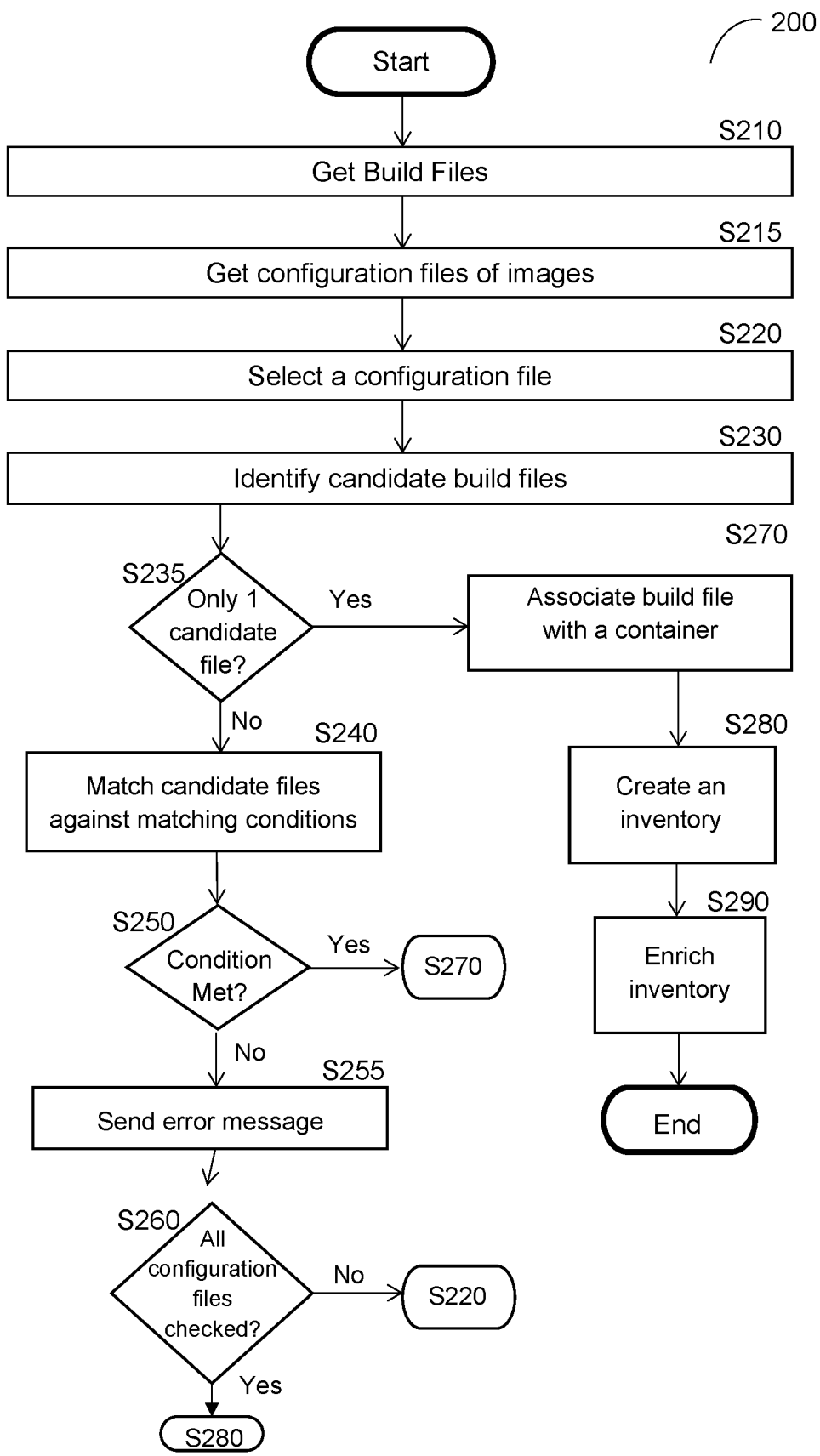
FIG. 2 is a flowchart illustrating a method for software containers attribution according to an embodiment.

FIG. 2 is an example flowchart 200 illustrating a method for software container attribution according to an embodiment.

At S210, build files of container images are retrieved from a code repository. A build file (e.g., a Dockerfile), when executed, causes the creation of a container image of a software image. The build files of the entire development history is retrieved.

At S215, configuration files of container images are retrieved from a container repository. A configuration file includes the information on layers of a container image of a software container. The configuration file, for example, may include a first layer of a container manifest. In an embodiment, the build files and configuration files are of container images of respective software containers executed in a production environment of an organization. Examples for the code and image repositories are provided above. It should be noted that S210 and S215 can be executed in parallel or in a reverse order.

At S220, a configuration file from the retrieved configuration files is selected and de-compiled. The de-compilation of a configuration file includes removing all information that cannot be utilized for the matching and association of build files. For example, all hash values are removed from the selected configuration file.

At S230, at least one candidate build file is identified for the selected (and de-compiled) configuration file. A candidate build file may be identified by matching the commands in the build files to a selected de-compiled configuration file.

For example, if a "build_file_1" includes the following commands:
build_file_1:
  FROM scratch
  RUN yum install-y httpd
  CMD ["echo", "Web Image created"]
And a selected configuration file A' includes the following commands:
  RUN yum install-y httpd
  CMD ["echo", "Web Image created"]
Then, the "build_file_1" is a candidate as the commands (RUN, CMD) in both files are the same.

Multiple candidates can be identified for numerous reasons. For example, if the user (e.g., programmer) saved the same build file in multiple locations (folders), the command and their variables do not exactly match due to compilation changes or when a container image is composed using a number of build files.

In an embodiment, the identification of candidate build files is performed based on one more or text search techniques. Such techniques may include using regulation expression, string matches, indexing, wild-card searches, and the like. It should be noted that all commands from the build file are matched to all commands in the selected configuration file, excluding the excluded commands. To this end, a configuration file may be searched for all commands starting from the last command in the file until the first excluded command is encountered.

At S235, it is checked if there is only one candidate build file, if so at S270, the only matching build file is determined to match the selected de-compiled configuration file, and the two files (build and configuration) are associated with each other. If S235 results with a No answer (there are multiple candidate build files), execution continues with S240.

At S240, all candidate build files are checked to determine if they meet at least one matching condition. As noted above, the matching condition includes, but are not limited to, similarity; creation time; number of commands; and hierarchical matching. The various matching conditions discussed in detail above.

At S250, it is checked if at least one matching condition is satisfied; and if so, execution continues with S270 where the build file is determined to match the selected (de-compiled) configuration file, and the two files (build and configuration) are associated with each other. Otherwise, at S255, an error message is sent that no build file was found for the selected configuration file.

At S260, it is checked if all configuration files have been checked; if so, execution continues with S280; otherwise, execution returns to S220 wherein a new configuration file is selected.

At S280, an inventory including all configuration files and their associated build files is created. That is, the inventory provides mappings between container images and their respective build files. As noted above, the inventory may be a data structure, such as a tree structure stored in a memory, storage, or database.

At S290, the inventory is enriched. To this end, the container layers of each container image designated in inventory is associated with a respective code line in the build file. Such code line is a command for creating the layer. In addition, each container image is enriched with any detected or reported vulnerability on a specific container image or layer within the image.

In an example embodiment, the method discussed with reference to FIG. 2, is performed by the attribution system 150, FIG. 1.

Figure 3:
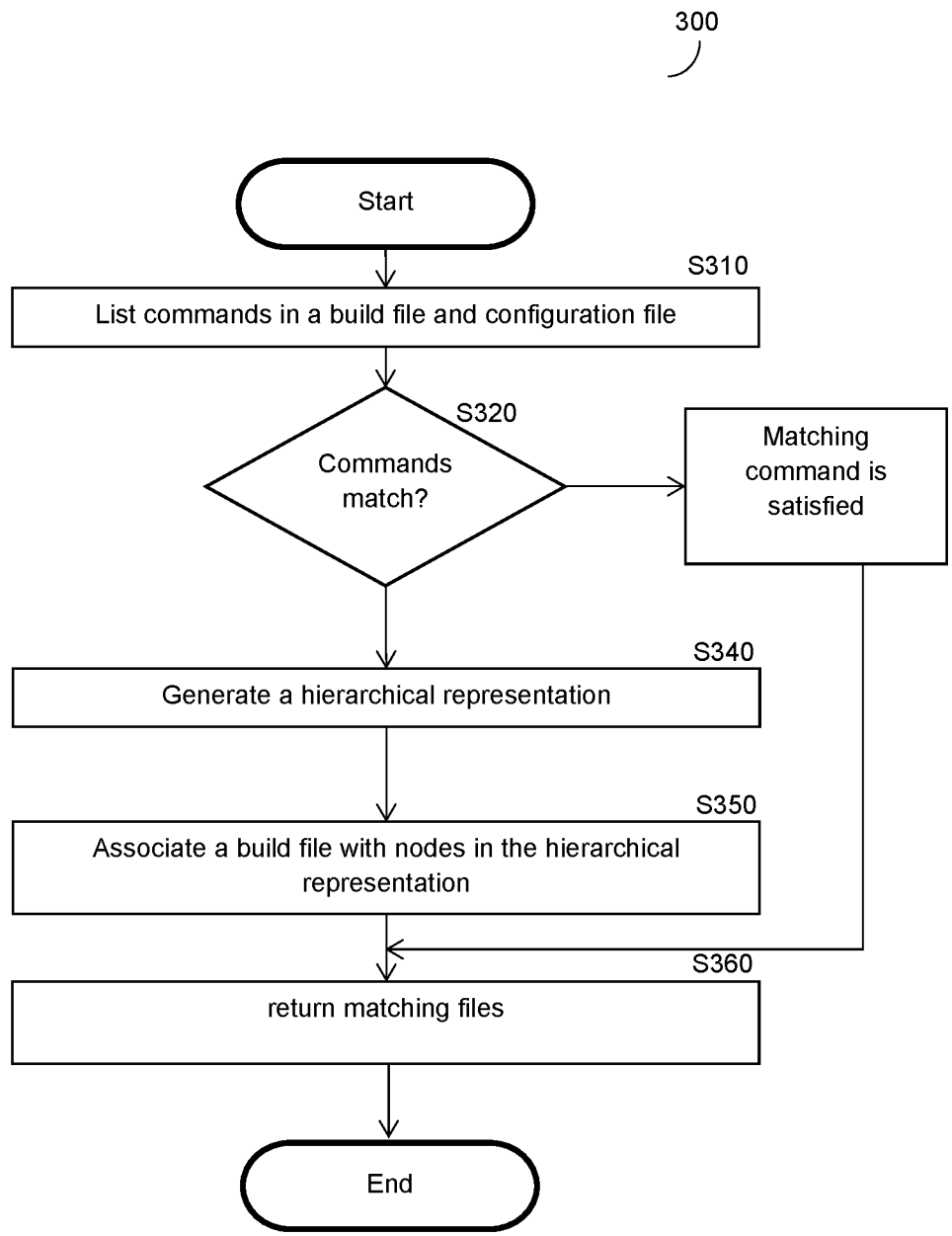
FIG. 3 is a flowchart illustrating a method for hierarchical matching according to an embodiment.

FIG. 3 is an example flowchart 300 for hierarchical matching utilized in an embodiment when a container image is composed from multiple build files. At S310, for each candidate file, a list of commands is extracted or listed starting from the last command in the build until encountering the first excluded command. For example, the following are two candidate build files:

build_file_2:
      FROM scratch
      apt-get install curl
    build_file_3:
      FROM A
      RUN ["echo 5"]

In this example, the list of commands includes: "apt-get install curl" and "RUN ["echo 5"]".

At S320, it is checked if the list of commands (from S310) is completely included in a selected configuration file (S220, FIG. 1). If so, at S330, the matching condition is determined to be satisfied. Otherwise, execution continues with S340. It should be noted that the matching of commands can be performed using the text searching techniques discussed above.

Execution reaches S340, when the build files are the same except for the excluded command(s). For example, for the following are two candidate build files:

build_file_4:
      FROM A
      RUN ["echo 5" ]
    build_file_5:
      FROM B
      RUN ["echo 5"]

In this example, the list of commands is the same except of the "FROM" commands. To resolve this, a hierarchical representation (a dependencies tree) of a container image (based on its configuration file) is generated. This is performed by searching for container images (based on their respective configuration files) that are completely included in other container images.

At S350, a build file is associated with each node in the hierarchical representation starting from the parent node. For example, if the hierarchical representation is a tree, the association of build file will start from the root. The association of a build file to a node (representing a container image) is as discussed above with respect to FIG. 2.

Figure 4:
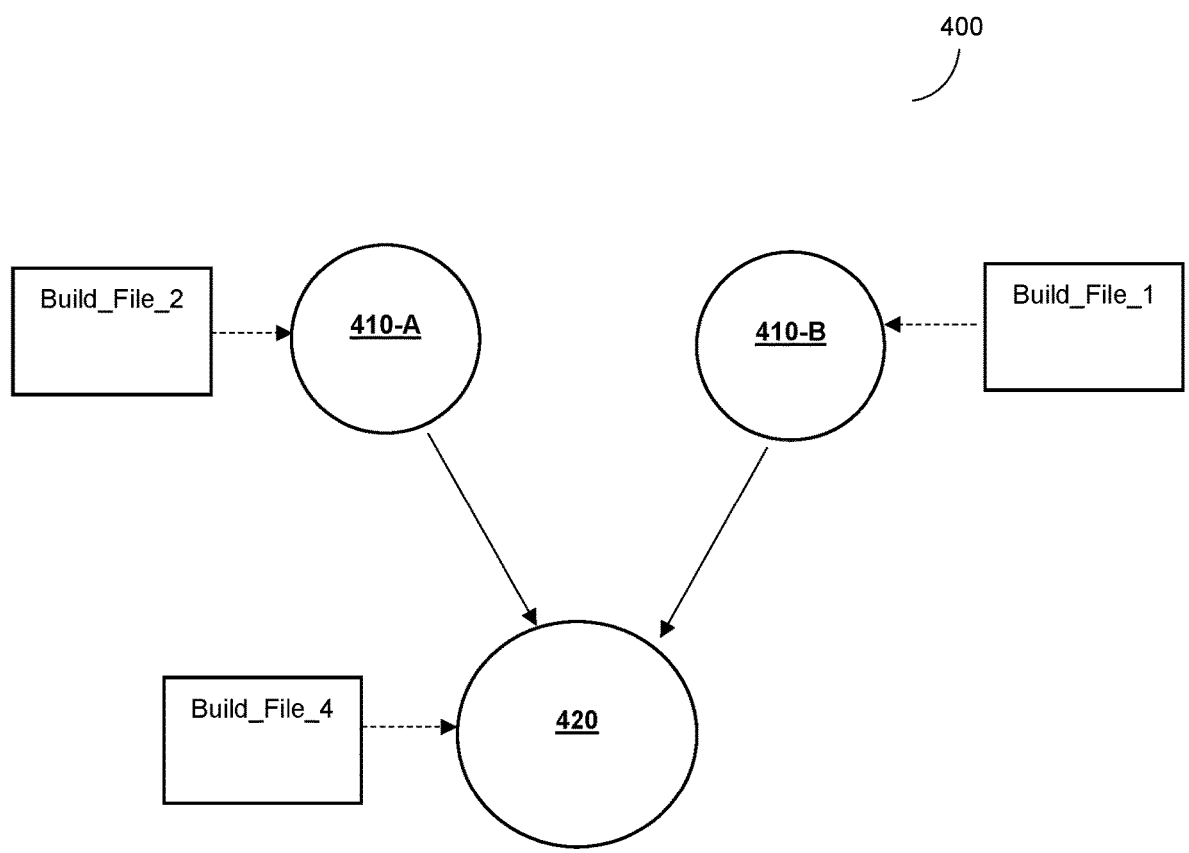
FIG. 4 is an example of diagram of hierarchical representation generating from container images and build files according to an embodiment.

FIG. 4 shows an example for the hierarchical representation 400 generated from build files 1 through 4. The hierarchical representation 400 includes two container images 410-A and 410-B to be associated with a container image 420. That is, either container image 410-A or 410-B are included in image 420.

Then, the root nodes (container images 410-A and 410-B) are associated with their respective build files. In the example, the container image 410-A is associated with the file "build_file_2" and image 410-A is associated with the file "build_file_1." This allows the association of container image 420 with the file "build_file_4", as the file "build_file_2" creates its parent image.

Returning to FIG. 3, at S360, the matching of candidate build files and images as determined at S350 is retuned.

Figure 5:
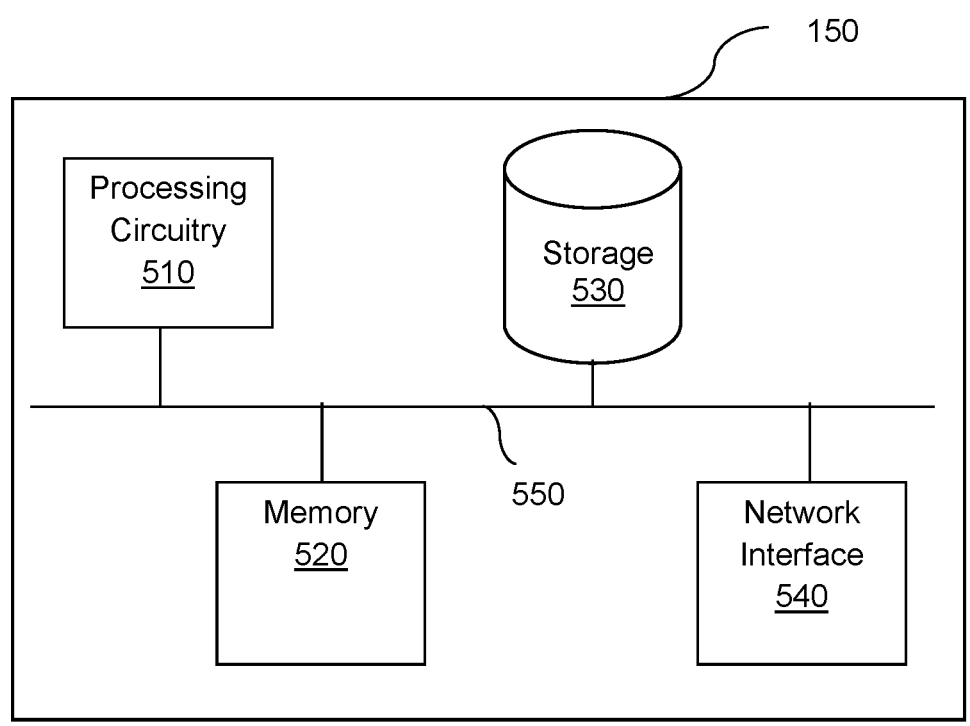
FIG. 5 is a schematic diagram of an attribution system configured according to an embodiment.

FIG. 5 is an example schematic diagram of the attribution system 150 according to an embodiment. The attribution system 150 includes a processing circuitry 510 coupled to a memory 520, a storage 530, and a network interface 540. In an embodiment, the components of the attribution system 150 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof.

In one configuration, software for implementing one or more embodiments disclosed herein may be stored in the storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 540 allows the attribution system 150 to communicate with the repositories 120 and 130, the detector 140, and database 160, through the network 170 as illustrated in FIG. 1.

It should be understood that the embodiments described herein are not limited to the specific architecture illustrated in FIG. 1, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for software containers attribution, comprising:
    de-compiling a configuration file of a container image of a software container;
    identifying at least one candidate build file in the de-compiled configuration file;
    determining if at least one matching condition is satisfied between each of the at least one candidate build file and the de-compiled configuration file;
        wherein determining if the at least one matching condition is satisfied further comprises, when there is more than one candidate build file, matching each of the candidate build files to the de-compiled configuration file based on a matching condition, wherein the matching condition includes any one of: similarity, a creation time, a number of commands, and a hierarchical matching;
        wherein the number of commands matching condition is satisfied when the number of commands, excluding FROM commands, in the de-compiled configuration file is the same as the number of commands in a candidate build file;
    associating the configuration file with each candidate build file satisfying the at least one matching condition; and
    updating an inventory with the associated configuration file and the respective candidate build file, wherein such association provides a direct mapping between the container image and each build file that formed the container image.

2. The method of claim 1, further comprising:
    retrieving any one of the configuration file and the container image from a software container repository; and
    retrieving build files from a code repository.

3. The method of claim 2, further comprising:
    determining attribution for each container image stored in the software container repository.

4. The method of claim 1, wherein identifying the at least one candidate build file further comprises:
    searching for matching commands in both the de-compiled configuration and build files, wherein a build file with at least one matching command is a candidate build file.

5. The method of claim 1, wherein determining if the at least one matching condition is satisfied, further comprises:
    determining if there is only one candidate build file; and
    associating the only one candidate build file with the de-compiled configuration file.

6. The method of claim 1, wherein the similarity matching condition is satisfied when all candidate build files are the same file and match the de-compiled configuration file.

7. The method of claim 1, wherein the creation time matching condition is satisficed satisfied when the creation time of a candidate build time is earlier than a creation time of a container image corresponding to the de-compiled configuration file.

8. The method of claim 1, wherein the number of commands matching condition is satisfied when the number of commands, excluding FROM commands, in the de-compiled configuration file is the same as the number of commends in a candidate build file.

9. The method of claim 1, further comprising:
    performing the hierarchical matching when the container image is formed from multiple build files.

10. The method of claim 9, wherein the hierarchical matching is satisfied when a dependency tree representing a relationship between the candidate build files and the container image matches commands, excluding FROM commands, listed in the de-compiled configuration file.

11. The method of claim 1, wherein updating the inventory further comprises:
    associating each container layer in the container image with a respective code line in the build file; and
    listing any vulnerability reported on at least one of: the container image and its image layers.

12. A non-transitory computer readable medium having stored thereon instructions for causing a processing circuitry to execute a process for software containers attribution, the process comprising:
    de-compiling a configuration file of a container image of a software container;
    identifying at least one candidate build file in the de-compiled configuration file;
    determining if at least one matching condition is satisfied between each of the at least one candidate build file and the de-compiled configuration file;
        wherein determining if the at least one matching condition is satisfied further comprises, when there is more than one candidate build file, matching each of the candidate build files to the de-compiled configuration file based on a matching condition, wherein the matching condition includes any one of: similarity, a creation time, a number of commands, and a hierarchical matching;
        wherein the number of commands matching condition is satisfied when the number of commands, excluding FROM commands, in the de-compiled configuration file is the same as the number of commands in a candidate build file;
    associating the configuration file with each candidate build file satisfying the at least one matching condition; and
    updating an inventory with the associated configuration file and the respective candidate build file, wherein such association provides a direct mapping between the container image and each build file that formed the container image.

13. A system for remediating software containers attribution, comprising:
  a processing circuitry; and
  a memory, the memory containing instructions that, when executed by the processing circuitry, configure the system to:
  de-compile a configuration file of a container image of a software container;
  identify at least one candidate build file in the de-compiled configuration file;
  determine if at least one matching condition is satisfied between each of the at least one candidate build file and the de-compiled configuration file;
  associate the configuration file with each candidate build file satisfying the at least one matching condition; and
  update an inventory with the associated configuration file and the respective candidate build file, wherein such association provides a direct mapping between the container image and each build file that formed the container image;
  wherein the system is further configured to:
  when there is more than one candidate build file, match each of the candidate build files to the de-compiled configuration file based on a matching condition, wherein the matching condition includes any one of: similarity, a creation time, a number of commands, and a hierarchical matching;
  wherein the number of commands matching condition is satisfied when the number of commands, excluding FROM commands, in the de-compiled configuration file is the same as the number of commands in a candidate build file.

14. The system of claim 13, wherein the system is further configured to:
  retrieve at least one of the configuration file and the container image from a software container repository; and
  retrieve build files from a code repository.

15. The system of claim 13, wherein the system is further configured to:
  determine attribution for each container image stored in the software container repository.

16. The system of claim 13, wherein the system is further configured to:
  search for matching commands in both the de-compiled configuration and build files, wherein a build file with at least one matching command is a candidate build file.

17. The system of claim 13, wherein the system is further configured to:
  determine if there is only one candidate build file; and
  associate the only one candidate build file with the de-compiled configuration file.

18. The system of claim 13, wherein the similarity matching condition is satisfied when all candidate build files are the same file and match the de-compiled configuration file.

19. The system of claim 13, wherein the creation time matching condition is satisfied when the creation time of a candidate build time is earlier than a creation time of a container image corresponding to the de-compiled configuration file.

20. The system of claim 13, wherein the system is further configured to:
  perform the hierarchical matching when the container image is formed from multiple build files.

21. The system of claim 20, wherein the hierarchical matching is satisfied when a dependency tree representing a relationship between the candidate build files and the container image matches commands, excluding FROM commands, listed in the de-compiled configuration file.

22. The system of claim 13, wherein the system is further configured to:
  associate each container layer in the container image with a respective code line in the build file; and
  list any vulnerability reported on at least one of: the container image and its image layers.

23. A method for software containers attribution, comprising:
  de-compiling a configuration file of a container image of a software container;
  identifying at least one candidate build file in the de-compiled configuration file;
  determining if at least one matching condition is satisfied between each of the at least one candidate build file and the de-compiled configuration file;
    wherein determining if the at least one matching condition is satisfied further comprises, when there is more than one candidate build file, matching each of the candidate build files to the de-compiled configuration file based on a matching condition, wherein the matching condition includes any one of: similarity, a creation time, a number of commands, and a hierarchical matching;
  performing the hierarchical matching when the container image is formed from multiple build files, wherein the hierarchical matching is satisfied when a dependency tree representing a relationship between the candidate build files and the container image matches commands, excluding FROM commands, listed in the de-compiled configuration file;
  associating the configuration file with each candidate build file satisfying the at least one matching condition; and
  updating an inventory with the associated configuration file and the respective candidate build file, wherein such association provides a direct mapping between the container image and each build file that formed the container image.

24. A non-transitory computer readable medium having stored thereon instructions for causing a processing circuitry to execute a process for software containers attribution, the process comprising:
  de-compiling a configuration file of a container image of a software container;
  identifying at least one candidate build file in the de-compiled configuration file;
  determining if at least one matching condition is satisfied between each of the at least one candidate build file and the de-compiled configuration file;
    wherein determining if the at least one matching condition is satisfied further comprises, when there is more than one candidate build file, matching each of the candidate build files to the de-compiled configuration file based on a matching condition, wherein the matching condition includes any one of: similarity, a creation time, a number of commands, and a hierarchical matching;
  performing the hierarchical matching when the container image is formed from multiple build files, wherein the hierarchical matching is satisfied when a dependency tree representing a relationship between the candidate build files and the container image matches commands, excluding FROM commands, listed in the de-compiled configuration file;

associating the configuration file with each candidate build file satisfying the at least one matching condition; and updating an inventory with the associated configuration file and the respective candidate build file, wherein such association provides a direct mapping between the container image and each build file that formed the container image.

25. A system for remediating software containers attribution, comprising:

a processing circuitry; and a memory, the memory containing instructions that, when executed by the processing circuitry, configure the system to:

de-compile a configuration file of a container image of a software container;

identify at least one candidate build file in the de-compiled configuration file;

determine if at least one matching condition is satisfied between each of the at least one candidate build file and the de-compiled configuration file;

associate the configuration file with each candidate build file satisfying the at least one matching condition; and update an inventory with the associated configuration file and the respective candidate build file, wherein such association provides a direct mapping between the container image and each build file that formed the container image;

wherein the system is further configured to:

when there is more than one candidate build file, match each of the candidate build files to the de-compiled configuration file based on a matching condition, wherein the matching condition includes any one of: similarity, a creation time, a number of commands, and a hierarchical matching; and perform the hierarchical matching when the container image is formed from multiple build files, wherein the hierarchical matching is satisfied when a dependency tree representing a relationship between the candidate build files and the container image matches commands, excluding FROM commands, listed in the de-compiled configuration file.

* * * * *